Figure 1:
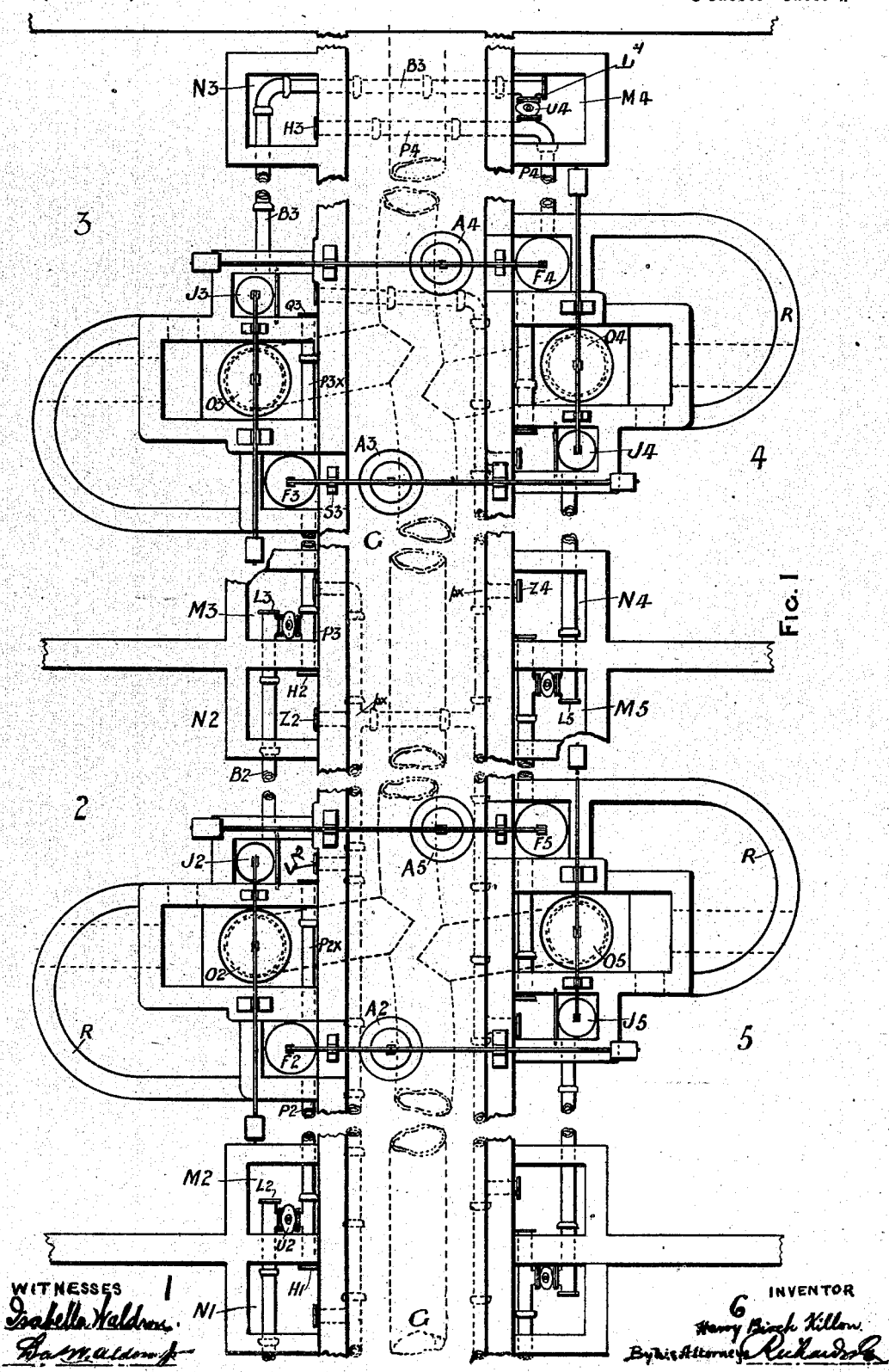

No. 714,801. Patented Dec. 2, 1902.
H. B. KILLON.
APPARATUS FOR USE IN THE TREATMENT OF SEWAGE.
(Application filed Oct. 15, 1901.)
(No Model.) 3 Sheets—Sheet 2.

No. 714,801. Patented Dec. 2, 1902.
H. B. KILLON.
APPARATUS FOR USE IN THE TREATMENT OF SEWAGE.
(Application filed Oct. 15, 1901.)
(No Model.) 3 Sheets—Sheet 3.
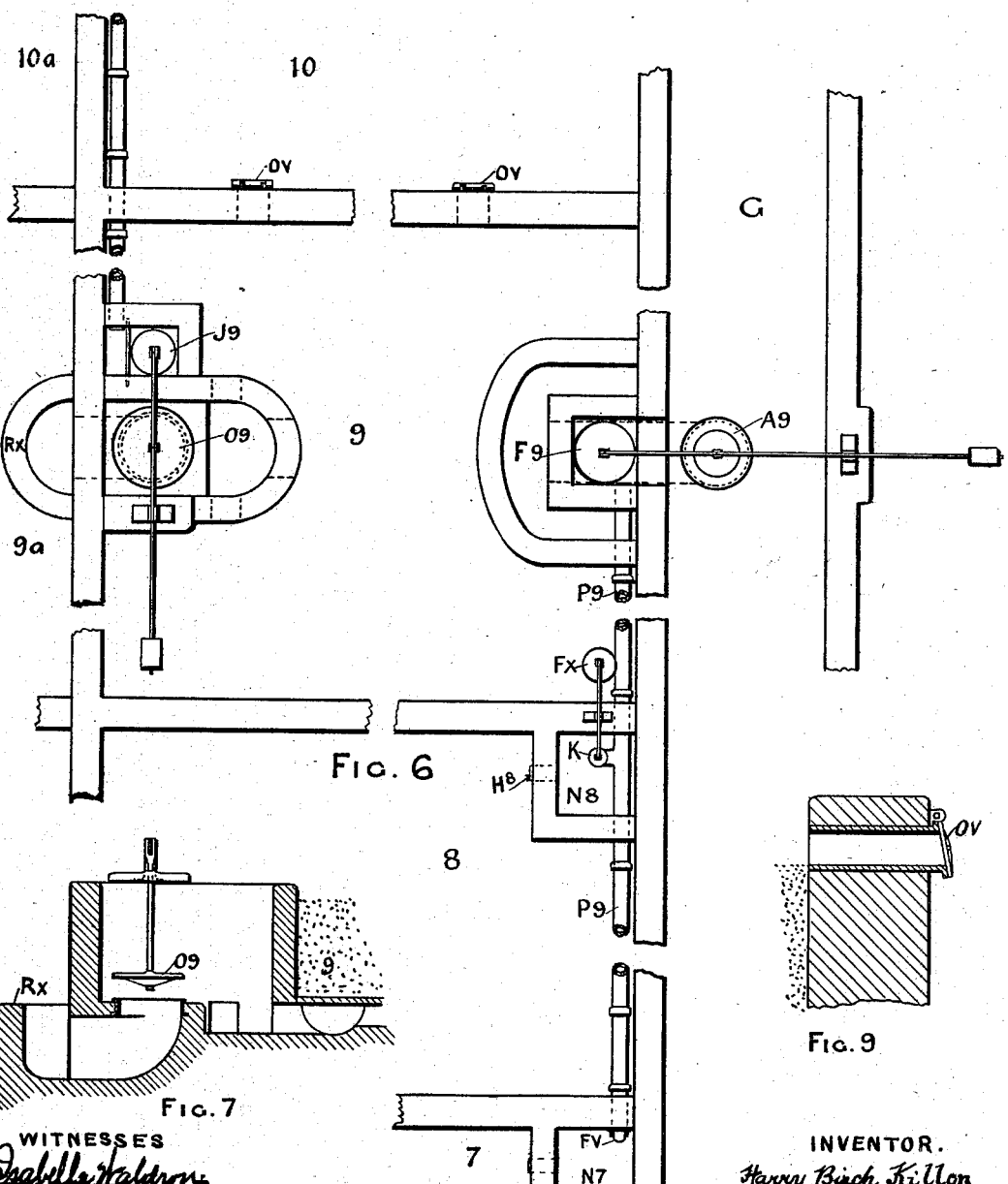
INVENTOR.
Harry Birch Killon

UNITED STATES PATENT OFFICE.

HARRY BIRCH KILLON, OF MANCHESTER, ENGLAND.

APPARATUS FOR USE IN THE TREATMENT OF SEWAGE.

SPECIFICATION forming part of Letters Patent No. 714,801, dated December 2, 1902.

Application filed October 15, 1901. Serial No. 78,706. (No model.)

*To all whom it may concern:*

Be it known that I, HARRY BIRCH KILLON, civil engineer, a subject of the King of Great Britain and Ireland, residing at 22 Cooper street, Manchester, in the county of Lancaster, England, have invented a certain new and useful Improvement in and in Connection with Apparatus for Use in the Treatment of Sewage and Waste Waters, (for which I have made application in Great Britain, No. 5,834, and dated March 20, 1901,) of which the following is a specification.

My said invention relates to improvements in apparatus for use in and in connection with the treatment of sewage and waste waters.

For the purification of sewage or other foul waters bacterial contact-beds are employed. These beds are provided with boundary-walls and impervious flooring and are filled with coke, clinkers, broken stone, or any other suitable material. Upon the innumerable surfaces of the filling material purifying bacteria are cultivated, the sewage coming in contact with such bacteria as the sewage stands in or passes through the interstices of the bed. It is usual to employ a series of beds and to pass the sewage into these *seriatim.* Each bed is filled in rotation and is then allowed to stand full for a short interval before the effluent is drained away from it. The bed is next allowed to stand empty, so that the oxygen of the air may come in contact with the bacterial agencies in the bed before it is again refilled with sewage.

The object of my invention is to provide apparatus which will insure the carrying on of these operations automatically. It is well known that sewage is highly corrosive in contact with metal, so that often apparatus which will be successful in pure water will after a time fail to act in sewage or sewage effluent owing to the choking of passages or the deleterious action of the sewage on the controlling mechanism or parts. It is therefore necessary that such apparatus shall be as simple as possible and substantial in character, and where any pipes are requisite for the passage of the liquid these shall be, as far as possible, of glazed stoneware or other material having a vitreous surface.

Under my invention I provide an apparatus in which both the period of quiescent contact of the sewage in the bed and the period of the aeration of the bed are regulated by and are inversely as the volume of incoming sewage. This prevents the overworking of the beds during rainy weather and allows sufficient time for their drainage and aeration between each filling.

By this invention a series comprising any number of beds of similar or varying areas and capacities can be connected up together and worked in a cycle. I may obtain secondary purification by similar contact in a lower series of beds by utilizing the outlet of a primary bed as the inlet to a secondary bed. A separate cycle would be established in the secondary beds in which the period of quiescent contact may be the same as in the primary beds relatively to the volume of incoming sewage per unit of time or may be reduced so that the period of aeration may be proportionately longer.

This invention also provides improved methods of effecting thorough drainage of the beds and of putting any bed out of the cycle of action for prolonged rest while the work is continued by the remainder.

It is in many cases most important that the minimum of fall shall take place in the liquid as between the invert of the inlet-sewer and the surface of the bacteria-bed. This is effected to the fullest possible extent in this invention.

To render my invention perfectly clear, I will now describe the same minutely and with reference to the annexed three sheets of drawings.

Figure 2:
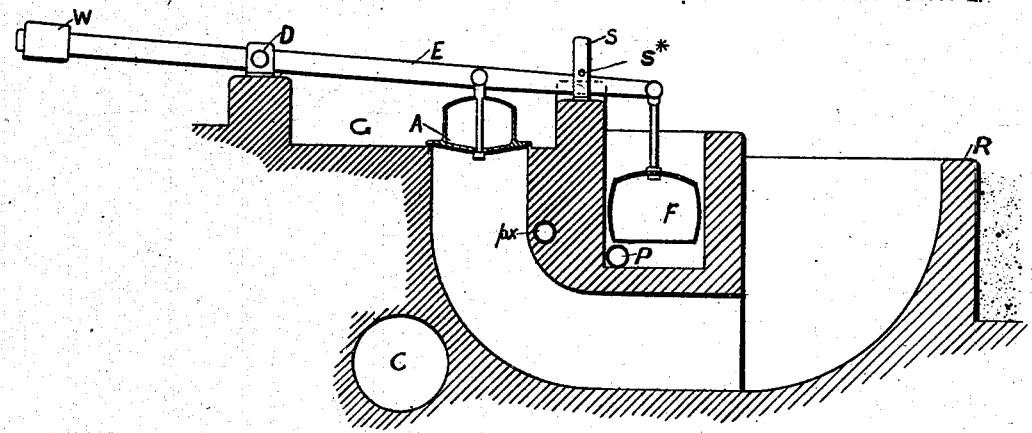
Figure 3:
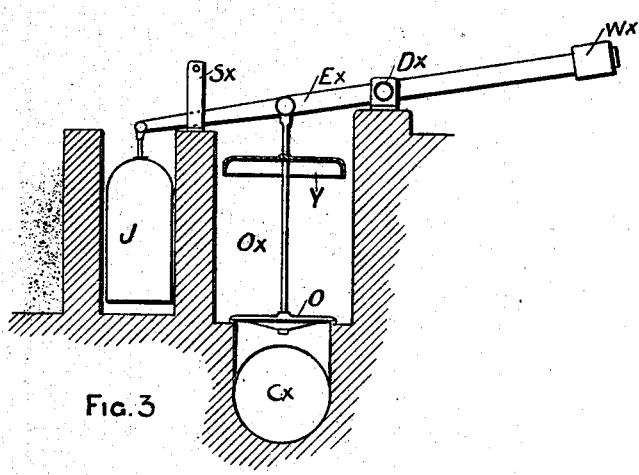
Figure 4:
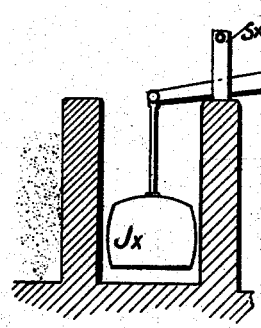
Figure 5:
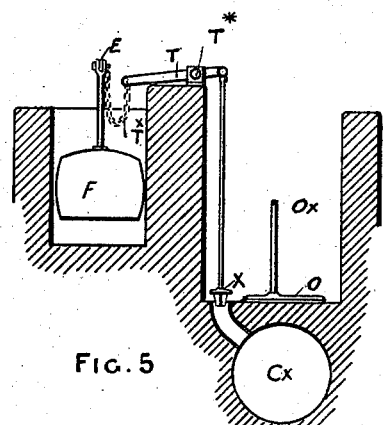

In the said drawings on Sheet 1, Figure 1 is a general plan of a portion of six bacteria-beds 1 2 3 4 5 6, it being assumed that these form part of a series of beds required to be used in a cycle. Less or more than six beds may constitute a series. The beds may be of any area and may be proportionate to the volume of sewage to be dealt with. On Sheet 2, Fig. 2 is a sectional elevation of a closed cylindrical inlet-valve A, showing its connection to a lever E, fulcrumed at D, from the same arm of which is also pendent a float F and on the other arm of which slides an adjustable counterweight W. The longer arm is guided in its rise and fall by a fixed forked standard S, within which it moves and by which, together with a removable pin S*, it can be fastened so as to maintain the valve A closed. Fig. 3 is a sectional elevation of a flat outlet-valve O, with its regulating-float Y, fixed to the valve-spindle, and its actuating-float J, all of which are pendent from the lever E$^\times$, fulcrumed at D$^\times$ and guided by the forked standard S$^\times$. Fig. 4 illustrates a modified form of float J$^\times$, actuating an outlet-valve in chamber O$^\times$, suitable for giving a reduced period of quiescent contact in a secondary bed placed adjacent to its primary bed and which also allows a longer relative period for drainage of the bed than that shown at Fig. 3. Fig. 5 is a sectional elevation of an auxiliary drainage-valve X, by which the continuous drainage of a bed is maintained until the inlet-valve A opens again. Fig. 6 is a plan of the apparatus required in connection with one first contact-bed when it is desired to make the period of quiescent contact in any bed nearly as long as that occupied by the filling of two other beds of its series. By forming an outlet to bed 9$^a$ similar and in a similar position in bed 9$^a$ to the outlet in bed 9 second contact would be given in bed 9$^a$ for a period about the same as that in bed 9. Fig. 7 is a section through the outlet-valve and channels of bed 9. Fig. 8 is a section through two manholes or access-chambers N$^7$ and N$^8$, showing elevations of the valves placed on the connecting-pipe P$^9$, as shown also in plan, Fig. 6. Fig. 9 shows a flap-valve which might be inserted in the division-walls.

The different parts of the apparatus are indicated by different characters.

When the part connected to a particular bed is indicated, the letter is followed by the number of the bed. A bed or chamber connected to it is said to be "full" when liquid has risen in the bed to the same height as the material in the body of the bed.

As shown in Figs. 1, 2, and 3, the beds are arranged so that the sewage from the common carrier G will commence to pass into any bed as soon as the next bed of anterior number in the cycle is almost full. It will continue to flow in until the interstices of the bed are filled up. It will then stand quiescent therein until the posterior bed next in order is almost full, when the effluent will commence to pass out of the bed into a common culvert C under the sewage-carrier G, or into an adjacent secondary bed for further purification, the surface level of which secondary bed would be just below the crest of the weir R$^\times$, Fig. 7.

The inlet-valve A, Fig. 2, of any bed is opened by the effluent which fills the float-chamber and buoys up the float F, arranged therein. The effluent finds access to the float-chamber by the pipe P, through which it afterward returns. Thus the float F is raised and lowered as the effluent flows into and from the float-chamber. In the same manner the outlet-valve O, Fig. 3, is opened by the buoyancy of the float J in liquid and closed by its weight in air. In each case most of the dead-weight of and on the connected arm of the lever is neutralized by the counterweight W or W$^\times$. From an inspection of Fig. 1 it will be seen that the chamber in which float F—say float F$^2$—is pendent is connected by means of the pipe $p^2$ and the manhole N' to the bed 1. One or both walls of N are perforated, so that as the bed 1 fills with sewage the manhole N' and the pipe P$^2$ and the chamber of float F$^2$ also fill to the same level, and when the liquid has nearly filled the bed 1, but before the float F$^2$ is wholly immersed, its buoyancy will cause it to rise and open the valve A$^2$. When the valve A$^2$ is opened, sewage finds its way into bed 2.

The chamber in which float J—say J$^2$—is pendent is connected by means of the pipe B$^2$ and the manhole M$^3$ to the bed 3. The manhole M$^3$, pipe B$^2$, and the chamber of float J$^2$ fill together as if they all formed part of bed 3, and before the liquid quite fills the bed 3 the float J$^2$ will rise and open valve O$^2$. It will be obvious that when the sewage effluent passes out of bed 1 it will also pass out of the chamber of float F$^2$ by way of the aforesaid connections between them. Upon this taking place the inlet-valve A$^2$ falls and cuts off the supply of sewage past the said valve A$^2$. In the same manner when the effluent passes out of bed 3 it will also pass out of the chamber of float J$^2$, and the outlet-valve O$^2$ will then fall.

With the beds arranged as shown in Fig. 1 and sewage constantly flowing into the carrier G one bed of the cycle will be filling while its anterior in the cycle will be standing full and the anterior to the latter will be emptying. All the other beds of the cycle will be standing empty save one or more, which may be still draining off the remainder of the liquid which stood in them.

If the beds and their connections are arranged as shown in Figs. 6 and 8, the above description will hold good, except that two beds instead of one will be standing full.

If the first cycle of beds discharge their effluent into a second cycle, the above description will hold good with respect to each cycle.

For the purpose of detailed description of the cycle of operations assume bed 1 to be empty or nearly so, bed 2 to be emptying, bed 3 to be standing full, bed 4 to be filling, while the remainder of the beds are empty. With the beds in this condition the inlet-valve A$^4$ and the outlet-valve O$^2$ will be standing open. As soon as bed 4 has filled to within a few inches of its full capacity the greater part of the floats F$^5$ and J$^3$ will be immersed and will then exert an upward pressure upon the lever-arms to which they are respectively connected, the pressure being sufficient to raise them, together with the valves A$^5$ and O$^3$. The sliding counterweights W and W$^\times$, Figs. 2 and 3, are adjusted to such a position upon their respective lever-arms that with a normal flow of sewage the valves $A^5$ and $O^3$, Fig. 1, will open at about the same time. Both the valves $A^5$ and $O^3$ will continue to rise, owing to their buoyancy and because valve $A^4$ is still open, admitting sewage to bed 4. At this point, however, the sewage-level in bed 3 is now falling rapidly, bringing down float $F^4$, so that valve $A^4$ falls upon its seat and shuts off the sewage-supply. The bed 4, by this time supplied, stands full, together with the float-chambers $F^5$ and $J^3$. The presence of the requisite quantity of effluent in the float-chambers $F^5$ and $J^3$ now causes the valves $A^5$ and $O^3$ to stand fully open. Valve $O^2$ also is still partly open, allowing time for bed 2 to drain, and it will not entirely close until bed 3 and consequently the chamber of float $J^2$ are themselves drained to a certain predetermined extent. One complete step in the cycle has now been described, and the same operations are repeated with respect to the other beds until the whole cycle is completed, and as the last bed of the cycle is connected up in a similar manner to the first bed it will be understood that the cycle is also repeated indefinitely so long as sewage continues to flow into the carrier G.

The proper drainage of the beds is most important, and I make special provision for this. An absolutely fixed time period during which the outlet-valve is open is not satisfactory, because the rate of flow of the sewage usually is not constant, and if in some cases it is constant a fixed time involves the use of a small cock or tube which is liable to corrode, and then it gives a variable waterway. I therefore give a relative time for bed-drainage, dependent upon the time required to drain another bed—the next posterior bed of the cycle—down to a certain level. For this purpose an elongated float J is used, Fig. 3, the base of which reaches below the aforesaid level and which, with the valve O and float Y, is so balanced by the counterweight $W^\times$ that the immersion of a few inches of its lower extremity will suffice to prevent the valve O falling upon its seat. Whenever the valve O is held suspended in such a manner, there would be no head of liquid above it to weight it down unless the bed of which O was the outlet-valve commenced again to refill, in which case the valve O would be carried down by the weight of water accumulating above it. The float J, however, is sufficiently large and exerts the necessary leverage to raise the valve O, with the maximum hydrostatic head upon it, when the chamber of float J is nearly full. When the outlet-valve chamber $O^\times$ is situated adjacent to the chamber of float F, as in Fig. 1, an auxiliary drainage-valve X, Fig. 5, may be employed, which may be kept so as to allow a bed to drain until its inlet-valve is again opened. Alongside the main outlet-valve O a smaller valve X of about four inches diameter is placed, with a waterway connected to the effluent channel $C^\times$. This auxiliary valve, as shown in Fig. 5, is suspended from the shorter arm of a lever T, pivoted at $T^\times$, to the longer arm of which one end of a chain is attached, the other end of the chain being connected to the longer arm of the inlet-valve lever E. When said arm of lever E and the float $f$ are in their lowest position, (valve A being closed,) a sufficient portion of the weight of the chain is borne by the longer arm of the lever T to overbalance the valve X and its connecting-rod, excepting when the valve X is weighted down by more than about three inches of hydraulic pressure. After the greater part of the liquid in the connected bed has been discharged through valve O the hydraulic pressure on valve X is so reduced that it rises and allows of the drainage of the bed through it; but it falls on its seat again when the longer arm of lever F rises and bears up the necessary portion of the chain.

The upper and movable part of the valve A consists of a hollow chamber of less mean diameter than that of its lower circular or other projecting edge which forms the valve-face proper. This hollow chamber maintains a more uniform load to be lifted by the float F, notwithstanding the varying head of sewage in the carrier G. When the valve is open, the sewage exerts an upward pressure upon the underside of the hollow chamber, tending to raise the valve to a height proportionate to the head of sewage in the carrier. The buoyancy of the valve A, however, will never be sufficient to prevent its closing when its float F is not buoyed up by liquid around it.

While an inlet-valve—say $A^4$—is slowly closing, a larger or smaller volume of sewage will pass through it, proportionate to the head of sewage in G. This, if much above or below the normal, will tend to over or under fill the bed 4. This variation of level would be very slight; but as it would affect the hydraulic head above the outlet-valve $O^4$ (in other words, the load against which that valve has to be opened by the float $J^4$) the float Y is added and is fixed to the spindle of valve $O^4$ at the normal high-water level of the bed 4. The depth of the float Y is fully equal to the maximum variation ever likely to occur in the high-water level of the bed, so that at each filling Y will be partially immersed. The liquid arising around it will be adding weight to and so retarding the opening of the valve O; but as the float Y is of slightly-greater diameter than the valve O the buoyancy of Y will more than neutralize the weight accumulating above valve O, so that the net result will be that any excessive quantity of liquid in a bed will tend to slightly accelerate the opening of its outlet rather than the reverse, and the under filling of a bed will have the opposite effect.

If a very abnormal volume of sewage ever collected in the carrier G, due to an inflow of storm-water or other cause, the following means are provided for accelerating the opening of the next valve in order, as well as for the wider opening of the valve then in use: The side walls of the carrier G are built to the level, as shown, under the fulcrum D, Fig. 2, excepting a short length under and around each of the standards, as S, so that any overflow from G passes into the chambers around the floats $F'$ to $F^6$, thence by way of the pipes $P'$ to $P^6$ to their respective beds; but as in one case such bed—say 3—and float-chamber $F^4$ would be full such overflow would tend to raise the float $F^4$, and consequently the inlet-valve $A^4$, or if already up to raise them still higher. The chamber of float $F^5$ would also be filling from bed 4, and the sewage overflowing would head up around the float $F^5$ and accelerate its rising, so that the proper sequence of opening would be maintained and no serious damage would result from the overflow.

When it is desired to put any bed—say bed 3—out of the cycle of action for a lengthened period of rest, it will not be necessary to connect by-passes to the outlet-valve chambers, as $O^\times$, which would require in large works large pipes and valves to admit of the transfer of the whole contents of a bed from one outlet-valve chamber to another, but simply to connect the chamber of float $F^4$ with bed 2 and the chamber of float $J^2$ with bed 4. The former is done, as shown in Fig. 1, by means of an additional stoneware pipe $P^{3\times}$, connecting the chamber of float $F^3$ with that of float $J^3$, upon which a valve $Q^3$ is placed, and this, together with the pipes $P^3$ $B^3$, part of $P^4$, and the valve $U^4$, complete the waterway between the manhole $N^2$ and the chamber of float $F^4$. Likewise the pipe $p^\times$ may be employed to convey liquid from bed 4 and manhole $N^4$ and valve $Z^4$ to valve $V^2$ and the chamber of the float $J^2$. Therefore when it is required to omit the bed 3 from the cycle of beds employed certain work must be done by hand—viz., the closing of the end of the pipe $B^2$ by the valve $L^3$ and of the pipe $B^3$ by the valve $L^4$ and of the pipe $P^4$ by the valve $H^3$ and the opening of the valves $Q^3$, $U^4$, $V^2$, and $Z^4$; also, the valve $A^3$ must be kept closed by the insertion of the pin $S^*$ in the wall-standard $S^3$ while the lever is depressed. The effect of the alteration to the valves described will be that when next the bed 2 fills up the chamber of float $F^4$ will also fill, and this will open valve $A^4$, while bed 3 continues to stand empty. As bed 4 fills the chamber of float $J^2$ will also fill, and this will open valve $O^2$.

It is desirable in some cases where double contact is given to reduce the period of quiescent contact in the secondary beds, leaving a proportionately longer period for their aeration and drainage. This is readily effected by forming the float, as $J^\times$, Fig. 4. Such a float may actuate the outlet-valve of a secondary bed the inlet of which forms the outlet of a primary bed. As will be seen from the drawings, the float $J^\times$ is of less depth and of greater diameter, but reaches down to the same effective level as the float marked J, Fig. 3, actuating the outlet-valve of the primary bed. The difference will be apparent by comparing Figs. 3 and 4. The float J of Fig. 3 rises only when its chamber is nearly full; but float $J^\times$, Fig. 4, would rise when its chamber was about half filled, the same water displacement having taken place in the shorter time, due to the greater area of the float. Neither float would, however, descend to its lowest position, and so close the valve connected to it, until its chamber was nearly empty again.

In order to increase the period of quiescent contact relative to the time occupied in filling a bed, the apparatus connected with any one bed (filled from a common carrier, such as G) would be as shown in Figs. 6 and 8.

The beds 7, 8, 9, 10, and 11 form part of a series of beds to be brought into use *seriatim*. The apparatus required for working bed 9 only is shown. As bed 8 fills effluent from it passes into manhole $N^8$ through a short pipe in its wall, and entering the pipe $P^9$ through the open valve K it enters the chamber or float $F^9$ and ultimately opens the valve $A^9$ in the manner already described. Valve $A^9$ will remain open until the alternate anterior bed 7 discharges its contents through its outlet-valve. When this occurs, the flap-valve F V will open and allow the contents of the pipe $P^9$ and the chamber of float $F^9$ to pass into the manhole $N^7$ and the bed 7. To prevent it being immediately refilled from the bed 8, the flat valve K is employed. This is closed by the float $F^\times$, connected to K by a lever and connecting-rod, as shown in Fig. 8. $F^\times$ rises as the bed 9 fills and falls as 9 empties, suitable means being provided to prevent the float $F^\times$ touching the solid material in the bed. The float $F^\times$ is of sufficient weight in air to maintain the valve K open while bed 8 and the chamber of float $F^9$ is filling, and also until bed 9 is partly filled; but the float $F^\times$ being buoyed up by the filling of bed 9 closes valve K before the discharge of the chamber of float $F^9$ through pipe $P^9$ and valve F V or of the bed 7 commences. Bed 8 will be empty, or nearly so, before bed 9 is discharged, thereby lowering the float $F^\times$ and opening the valve K. Thus it will be seen that the pipe $P^9$ and chamber of float $F^9$ will always be filled through valve K and emptied through valve F V. The bed 9 will stand full until bed 11 fills up and sufficient of its effluent enters pipe $L^{11}$, manhole $M^{11}$, pipe $B^9$, and the chamber of float $J^9$ to open the valve $O^9$. By-passes can be connected to a series of such beds, as 9, by such means as have already been described, so that any bed may be put out of the cycle when required.

Vibration of the valves A and O may be prevented by any well-known provision.

In order to drain off any superfluous sewage which may obtain access to a bed and stand upon it above the material in the body of the bed where it would not be in proper contact with that material, one or more reflux or flap valves O$^y$ may be inserted in the division-walls of a bed, as shown in Fig. 9 and in plan, Fig. 6. Through these valves any such superfluous sewage would flow into the next posterior bed of the cycle, where it would undergo purification in the ordinary manner.

I declare that what I claim is—

1. In an apparatus for the treatment of sewage or other liquid, the combination of a series of three or more purification-beds with valves covering inlet and outlet ports, and a supply-main G from which liquid may pass continuously to one or other of the beds, each inlet-valve of a bed being controlled by mechanism and a single float which is free to rise before immersion in liquid from a preceding bed thereby uncovering said inlet-port, and to fall as the liquid in said preceding bed subsides, and separate means for operating said outlet-ports, substantially as described.

2. In an apparatus of the class described, the combination of a primary bed 11 and a secondary bed 9$^a$ with inlet-ports leading thereto, a float-chamber adjacent to the secondary bed, a pipe connection whereby said float-chamber is filled on the filling of the primary bed, connections whereby the filling of said float-chamber opens the inlet-valve of the secondary bed, and means for thoroughly draining said beds.

3. In an apparatus of the class described, the combination with a series of beds having valved inlets, of a supply-main from which liquid may pass continuously to one or other of the series, a float-chamber adjacent to each bed, a float in each chamber having a connected valve-operating lever, a waterway therefrom to a preceding bed whereby the filling of said preceding bed fills said float-chamber, raising the float and opening the valve by means of float-lever, a second float-chamber adjacent to each bed having a pipe connection to a succeeding bed in the series, a second float in said second float-chamber, and an outlet-port from each bed controlled by said second float.

4. In apparatus of the class described, a series of three or more beds or chambers filled and emptied *seriatim*, a supply-main G, an inlet-valve A to a bed, said valve being actuated by independent mechanism controlled by a float F in a chamber connected by a waterway P to another bed in the series, so that as the said other bed fills the said float rises and opens the said valve, and as said other bed empties, the float falls and closes said inlet, in combination with an outlet to each bed and means for operating said outlet.

5. In an apparatus of the class described, a series of three or more purification-beds, an open carrier G from which sewage flows continuously to one or other of the beds, waterways connecting said beds and said carrier, a separate valve for controlling each waterway, a separate float in a chamber connected to a preceding bed for operating such valve, in combination with a hollow chamber connected to said valve tending to neutralize the hydraulic pressure on said valve when closed.

6. In apparatus of the class described, a series of four or more purification-beds, each provided with separate inlet-valve A and outlet O actuated respectively by mechanism from separate chambers connected by separate waterways P and B to separate beds, in combination with means for putting any bed out of use at any time, consisting of additional waterways P$^×$, $p^×$, and hand-valves or stop-plates controlling all the said waterways, and means for maintaining the inlet of the bed out of use closed, substantially as described.

7. In apparatus of the class described, a plurality of three or more bacteria-beds filled, standing full, and emptied, automatically and in rotation, an inlet A, and an outlet O, to each bed, in combination with means by which any excess liquid in any bed, such as bed 9, may overflow to the next succeeding bed 10 then being also filled through its ordinary inlet A, substantially as described.

8. In apparatus of the class described, a series of beds filled and emptied *seriatim*, each through a separate inlet A, and outlet-valve O respectively, the opening of said outlet-valve being retarded by the hydraulic head above it, in combination with a float Y, counteracting the retardation due to part of said hydraulic head.

9. In apparatus of the class described, a series of beds filled *seriatim*, an open channel or chamber G common to all the beds and containing inlets to said beds, in combination with float-chamber and overflow-apertures from channel G leading into said float-chambers, the floats therein being so connected to the said inlets, that any overflow from channel G tends to open one of the said inlets.

10. In apparatus of the class described, a series of three or more purification-beds, a supply-main G, means admitting liquid to each bed in rotation, in combination with an outlet-valve O to each bed, a float J for controlling each valve and of a depth approximately equal to that of the bed itself, a separate chamber for each float, a pipe from a succeeding bed for applying liquid to each separate chamber, so that said outlet-valve will open when said succeeding bed is nearly full and will close when it is nearly empty, and a lever E$^×$ and an adjustable counterweight W$^×$ for counterbalancing the valve and float.

11. In apparatus of the class described, a series of beds required to be filled and emptied *seriatim*, an inlet-valve A and a main outlet-valve O to each bed, in combination with an auxiliary outlet-valve X closed by its own weight in air, a counterweight or chain T$^×$ actuated by its connections to the inlet-valve A, and opening said valve X by its weight in air.

12. In apparatus of the class described, a series of four or more beds or chambers required to be filled and emptied *seriatim*, a supply-main G therefor, in combination with inlet-valves, means whereby said inlet-valves are opened by means of liquid from one preceding bed, and closed by the subsidence of liquid in another preceding bed, outlet-valves and means whereby said outlet-valves are actuated by liquid from a succeeding bed.

13. In apparatus of the class described, a series of three or more primary beds, in combination with a series of three or more secondary beds, each series being filled and emptied *seriatim*, an inlet-valve for each bed, and an outlet-valve and means whereby said outlet-valve is actuated separately by the filling and emptying of preceding and succeeding beds, the outlet of each primary bed forming also the inlet of a secondary bed 14. In apparatus of the class described, a series of three or more preferably rectangular purification-beds, a supply-main, means admitting liquid to and filling each bed in rotation in combination with an outlet-port to each bed, a float connected by independent mechanism to, and controlling said port, a chamber containing said float, a waterway and hand-valves or stop-plates connecting said chamber to one or other succeeding bed at will so that as said other bed fills, said port is opened, and as said other bed is discharged said port is slowly closed.

15. In apparatus of the class described, a series of four or more bacteria-beds with inlet and outlet ports, means charging said beds *seriatim*, said means being actuated by liquid in a chamber from a preceding bed, in combination with a pipe P⁹ connecting said chamber to two preceding beds, the valve K through which said chamber is filled, the float F˟ for actuating said valve, and the valve F V through which the contents of said chamber are discharged.

In witness whereof I have hereunto set my hand in presence of two witnesses.

HARRY BIRCH KILLON.

Witnesses:
RICHARD WEBSTER IBBERSON,
ALFRED YATES.